United States Patent
Imaoka

(10) Patent No.: US 10,075,599 B2
(45) Date of Patent: Sep. 11, 2018

(54) IMAGE PROCESSING DEVICE

(71) Applicant: KYOCERA Document Solutions Inc., Osaka (JP)

(72) Inventor: Kunio Imaoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/850,341

(22) Filed: Dec. 21, 2017

(65) Prior Publication Data

US 2018/0183952 A1    Jun. 28, 2018

(30) Foreign Application Priority Data

Dec. 28, 2016  (JP) ................. 2016-256867

(51) Int. Cl.
*H04N 1/00* (2006.01)
*G06F 3/0482* (2013.01)

(52) U.S. Cl.
CPC ....... *H04N 1/00411* (2013.01); *G06F 3/0482* (2013.01); *H04N 1/0044* (2013.01); *H04N 1/00474* (2013.01); *H04N 2201/0094* (2013.01)

(58) Field of Classification Search
CPC ............. H04N 1/00411; H04N 1/0044; H04N 1/00474; H04N 2201/0094; G06F 3/0482
See application file for complete search history.

(56) References Cited

U.S. PATENT DOCUMENTS

| 2012/0099129 A1* | 4/2012 | Ogino | G06F 3/04883 358/1.13 |
| 2015/0320299 A1* | 11/2015 | Krupnik | A61B 1/00009 348/65 |
| 2018/0004461 A1* | 1/2018 | Nakamura | G03G 15/502 |

FOREIGN PATENT DOCUMENTS

JP    2014-067123 A    4/2014

* cited by examiner

*Primary Examiner* — Iriana Cruz

(74) *Attorney, Agent, or Firm* — Studebaker & Brackett PC

(57) ABSTRACT

An image processing device includes a touch sensor and a controller. When an operation in which two icons including a function selection icon and a detailed setting selection icon are simultaneously pressed is received in a reception screen, the controller sequentially switches a setting value of a detailed setting corresponding to the pressed detailed setting selection icon at regular predetermined intervals and changes an image displayed in a preview area to a processed image on which the function has been executed at the switched-to setting value, while the simultaneous pressing operation is continued on the two icons.

6 Claims, 11 Drawing Sheets

IMAGE PROCESSING DEVICE

INCORPORATION BY REFERENCE

The present application claims priority under 35 U.S.C. § 119 to Japanese Patent Application No. 2016-256867, filed on Dec. 28, 2016. The contents of this application are incorporated herein by reference in their entirety.

BACKGROUND

The present disclosure relates to an image processing device, specifically an image forming device including a plurality of functions related to image processing.

An image processing device which includes functions related to image processing (known as a "multifunction peripheral") is commonplace. The image processing includes an image forming function to form an image on recording paper, an image reading function to read an image from an original document, and the like. A user must perform various settings to the image processing device in order to execute desired processing with the image processing device. In recent years, some image forming apparatuses employ a touch panel as a device for inputting instructions. Herewith, the user can perform the various settings more intuitively.

SUMMARY

An image processing device according to an aspect of the present disclosure includes a touch panel and a controller. The touch panel includes a display and a touch sensor. The controller controls display operation by the display and receives operations on the touch sensor. The controller controls operations for executing a plurality of functions according to the operations on the touch sensor. The functions are functions related to image processing, and include at least an image forming function to form an image on recording paper and an image reading function to read an image from an original document. The controller displays a reception screen which includes a plurality of function selection icons, a plurality of detailed setting selection icons, and a preview area on the display. The function selection icons respectively correspond to the functions. The detailed setting selection icons respectively correspond to a plurality of detailed settings which are configurable with respect to each of the functions. The preview display area shows a processed image on which one function from among the functions has been executed. When a first operation, from among the operations, in which at least two icons including one function selection icon from among the function selection icons and at least one detailed setting selection icon from among the detailed setting selection icons are simultaneously pressed is received in the reception screen, the controller sequentially switches a setting value of a detailed setting corresponding to the pressed detailed setting selection icon at regular predetermined intervals and changes an image displayed in the preview area to a processed image on which the function has been executed at the switched-to setting value, while the first operation is continued. When the first operation is ceased, the controller stops switching the setting value and changing the image displayed in the preview area. After the first operation has been ceased, when an execution instruction operation of the function is received, the controller controls an operation for executing the function at the setting value specified when the first operation was ceased.

DETAILED DESCRIPTION

As follows, an image processing device according to an embodiment of the present disclosure is described with reference to the drawings.

Figure 1:
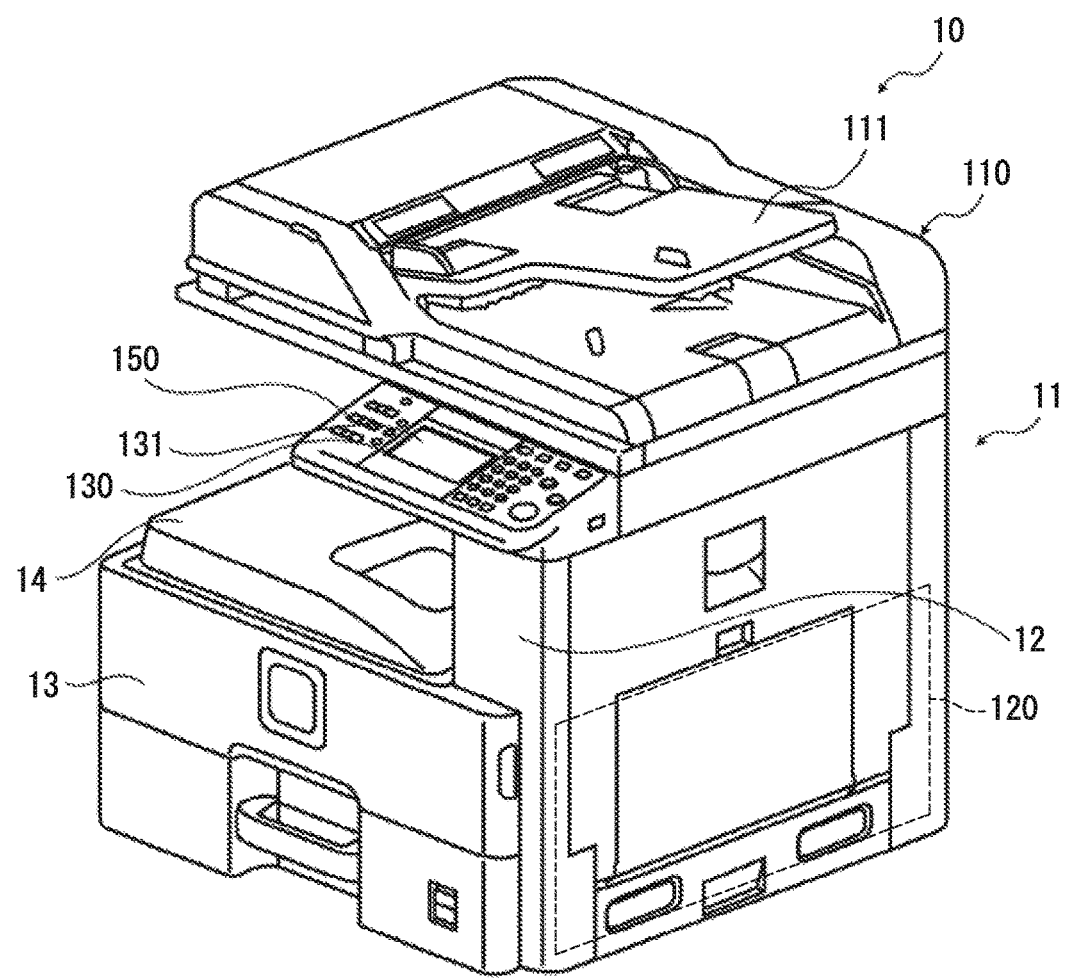
FIG. 1 is a perspective view illustrating a configuration of a multifunction peripheral, as an example of an image processing device according to an embodiment of the present disclosure.
Figure 2:
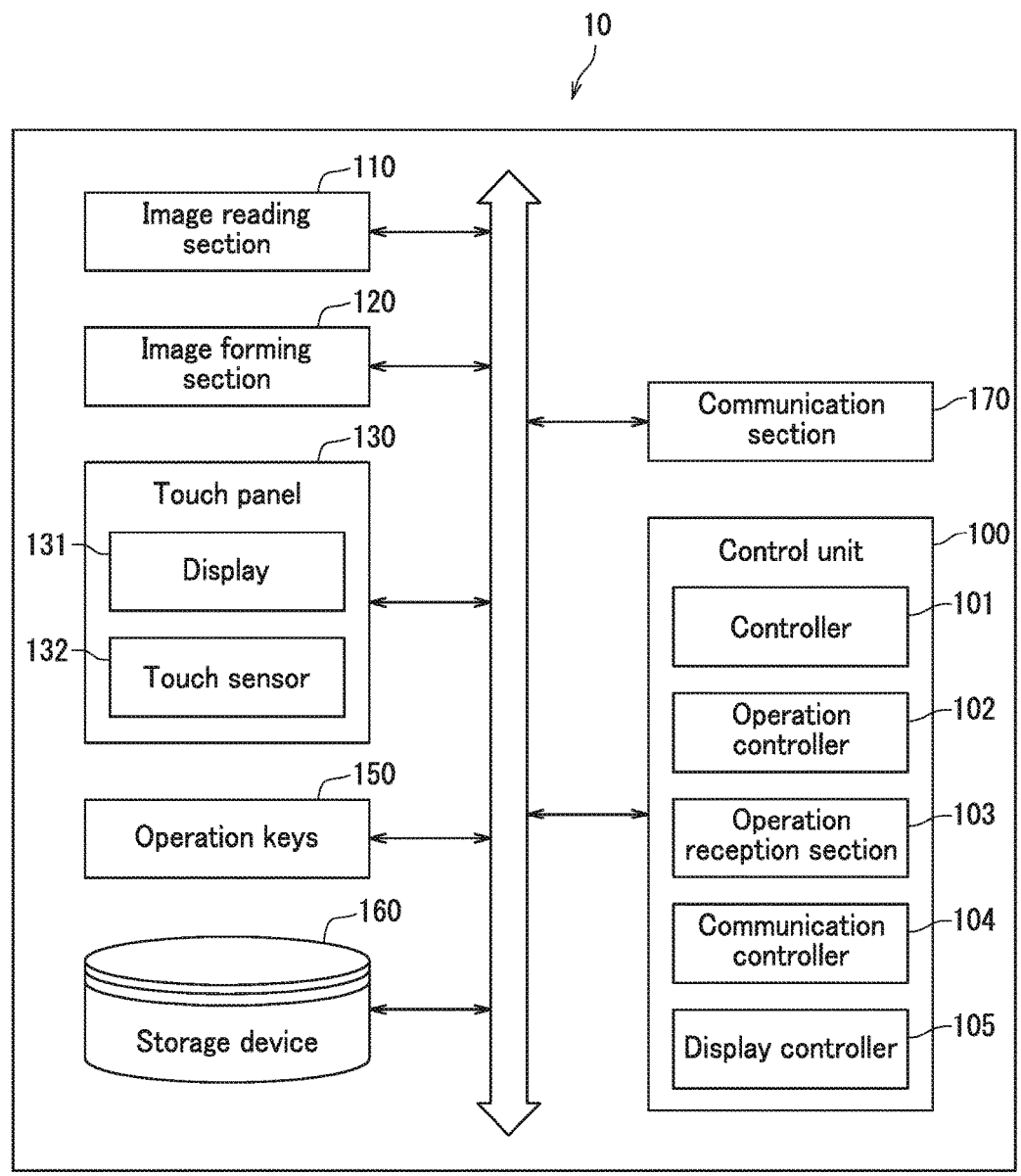
FIG. 2 is a block diagram illustrating an internal configuration of the multifunction peripheral, as an example of the image processing device according to the embodiment of the present disclosure.

FIG. 1 is a perspective view illustrating a configuration of a multifunction peripheral, as an example of the image processing device according to the embodiment of the present disclosure. FIG. 2 is a block diagram illustrating an internal configuration of the multifunction peripheral.

A multifunction peripheral 10 includes functions related to image processing. The functions related to image processing include at least an image forming function to form an image on recording paper, and an image reading function to read an image from an original document. In the present embodiment, the multifunction peripheral 10 further includes functions such as a facsimile function, in addition to the above image forming function and image reading function.

As illustrated in FIG. 1, the multifunction peripheral 10 basically includes a main body 11, an image reading section 110, and a coupling section 12. The image reading section 110 is arranged above the main body 11. The image reading section 110 includes a document table 111. The image reading section 110 is a scanner, for example. The coupling section 12 is provided between the image reading section 110 and the main body 11, and couples the image reading section 110 to the main body 11.

The main body 11 includes components such as an image forming section 120, a paper feed section 13, and an exit tray 14. The image forming section 120 electrographically forms an image on recording paper, for example. The image forming section 120 includes an exposure device, a charger, a developing device, a photosensitive drum, a transfer device, and a fixing device. The paper feed section 13 feeds recording paper to the image forming section 120.

When the multifunction peripheral 10 executes the image reading function, the image reading section 110 sequentially reads a sheet at a time from an original document sheaf placed on the document table 111, and generates image data composed of a plurality of pages. The image data is stored in a storage device 160. Note that operation of the image reading section 110 is controlled by an operation controller 102 described hereafter (refer to FIG. 2).

When the multifunction peripheral 10 performs an image forming operation, the image forming section 120 forms an image (a toner image) on the recording paper fed from the paper feed section 13, based on the image data stored in the storage device 160. The toner image formed on the recording paper undergoes fixing processing. In detail, the toner image formed on the recording paper is fixed to the recording paper by the unillustrated fixing device. The recording paper with the image formed thereon and fixed thereto is ejected to the exit tray 14. Note that the operation of the image forming section 120 is controlled by the operation controller 102.

The multifunction peripheral 10 further includes a touch panel 130 and operation keys 150. The touch panel 130 and the operation keys 150 are arranged on the outer surface of a casing. The casing constitutes an outer shell of the multifunction peripheral 10. The touch panel 130 includes a display 131 and a touch sensor. The display 131 is a liquid-crystal display (LCD) or an organic light-emitting diode (OLED) display, for example. The display 131 displays various screens under control of a display controller 105 described hereafter.

The touch sensor 132 is arranged on the front surface of the display 131. The touch sensor 132 is a touch sensor that uses a resistive film method or an electrostatic capacitance method, for example. The touch sensor 132 detects contact (touch) of a detectable object. The detectable object is a finger of a user, for example. As well as detecting the contact of the detectable object, the touch sensor 132 detects a contact location of the detectable object. When the contact of the detected object is detected, the touch sensor 132 outputs a detection signal indicating coordinates of the contact location to an operation reception section 103 (refer to FIG. 2). Note that the touch sensor 132 also includes a touch sensor that detects proximity of the finger or the like of the user that is closer than a specific distance to the touch sensor 132, even when direct contact is not made. Because of this, "contact" according to the present embodiment includes proximity of the finger or the like that is closer than the above-mentioned specific distance, as well as contact with the touch sensor 132.

The operation keys 150 are hard keys, for example. The hard keys include keys such as a menu key, arrow keys, and an enter key. The menu key is a key for bringing up a menu. The arrow keys are keys for moving a focus of a graphical user interface (GUI) composing the menu. The enter key is a key for confirming an operation on the GUI composing the menu.

As illustrated in FIG. 2, the multifunction peripheral 10 further includes the storage device 160, a communication section 170, and a control unit 100.

The storage device 160 includes a high-capacity storage device such as a hard disk drive (HDD).

The communication section 170 is a network interface including a communication module such as a wireless local area network (WLAN) adapter. Alternatively, the communication section 170 is a facsimile unit which performs facsimile communication using a telephone line or an internet connection.

The control unit 100 includes components such as a controller, random access memory (RAM), and read-only memory (ROM). The controller includes either or both a processor such as a central processing unit (CPU) and an integrated circuit such as an application-specific integrated circuit (ASIC) and a field-programmable gate array (FPGA). The control unit 100 functions as a controller 101, the operation controller 102, the operation reception section 103, a communication controller 104, and the display controller 105 through the CPU executing information processing programs stored on the above-mentioned ROM or the storage device 160. Note that the controller 101, the operation controller 102, the operation reception section 103, the communication controller 104, and the display controller 105 of the control unit 100 may be implemented by respective hardware circuitry and not through operations based on the information processing programs.

The controller 101 governs overall operation control of the multifunction peripheral 10.

The operation controller 102 controls operations for executing the respective functions included in the multifunction peripheral 10, according to operations received by the operation reception section 103. The operation controller 102 is connected to components such as the image reading section 110, the image forming section 120, the touch panel 130, the operation keys 150, the storage device 160, and the communication section 170. The operation controller 102 performs operation control of each connected above-mentioned component and performs sending and receiving of signals or data between each component.

The operation reception section 103 receives user operations on the touch sensor 132, based on detection signals output from the touch sensor 132. Also, the operation reception section 103 receives user operations using the operation keys 150 such as the hard keys.

These user operations include operations such as a touch operation, a slide operation (including a flick operation or a swipe operation), a drag operation, a pinch-out operation, and a pinch-in operation. For example, when the user makes contact with the touch sensor 132 using a finger and then lifts the finger from the contact location, the touch sensor 132 outputs a detection signal to the operation reception section 103 indicating the location where the contact was detected. Upon receiving the detection signal indicating the location where the contact was detected, the operation reception section 103 designates the operation input by the user as a touch operation. Herewith, the operation reception section 103 receives the touch operation. Also, when the finger is moved over the touch sensor 132 while making contact with the touch sensor 132, the touch sensor 132 outputs a detection signal to the operation reception section 103 indicating locations passed by the finger between the beginning location where the contact was first detected and the ending location where the contact was last detected. Upon receiving the detection signal indicating the locations passed by the finger, the operation reception section 103 designates the operation input by the user as a slide operation. Herewith, the operation reception section 103 receives the slide operation.

The communication controller 104 controls a communication operation of the communication section 170. Under control of the communication controller 104, the communication section 170 performs sending and receiving of data between the multifunction peripheral 10 and a personal computer (PC) or other image forming apparatus connected thereto via a network such as a local area network (LAN). Also, under the control of the communication controller 104, the communication section 170 performs facsimile communication with another facsimile machine.

The display controller 105 controls a display operation of the display 131.

Figure 3:
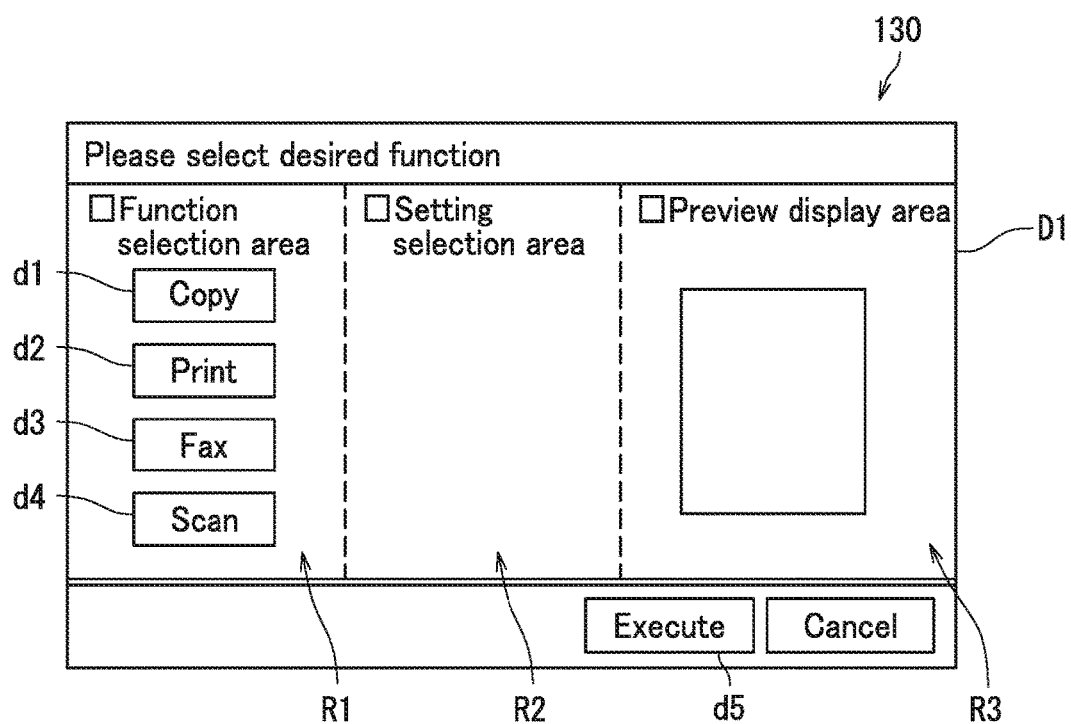
FIG. 3 is a diagram illustrating an example of a reception screen displayed by a touch panel of the multifunction peripheral, as an example of the image processing device according to the embodiment of the present disclosure.

The display 131 (touch panel 130) displays a reception screen for receiving an instruction for the multifunction peripheral 10. FIG. 3 is a diagram illustrating an example of a reception screen D1 displayed by the touch panel 130. As illustrated in FIG. 3, the reception screen D1 includes a function selection area R1, a setting selection area R2, and a preview display area R3.

The function selection area R1 is an area for receiving a selection of a function to be executed by the multifunction peripheral 10, from the plurality of functions included in the multifunction peripheral 10. A plurality of icons d1 to d4 (an example of function selection icons) respectively corresponding to the functions are arranged in the function selection area R1. In the example illustrated in FIG. 3, the icon d1 corresponds to a "copy function", the icon d2 corresponds to a "print function", the icon d3 corresponds to a "facsimile function", and the icon d4 corresponds to a "scan function". Corresponding relationships of the functions to these icons are stored in the storage device 160. When a pressing operation (touch operation) is performed on one of the icons d1 to d4, the operation reception section 103 receives the pressing operation (touch operation) on the pressed icon as an operation to select the function corresponding to the icon.

The setting selection area R2 is an area for receiving settings related to functions selected in the function selection area R1. As illustrated in FIG. 3, under normal conditions, no icons are displayed in the setting selection area R2. Normal conditions are when none of the icons d1 to d4 arranged in the function selection area R1 are pressed and no functions are selected. By contrast, as illustrated in hereafter described FIGS. 5A and 5B, in a condition where one of the icons d1 to d4 arranged in the function selection area R1 is pressed and a function is selected, a plurality of detailed setting selection icons d7 to d13 is displayed in the setting selection area R2. The icons d7 to d13 respectively correspond to a plurality of configurable detailed settings pertaining to the function selected in the function selection area R1.

The preview display area R3 is an area in which a processed image is displayed. The function selected in the function selection area R1 has been executed on the processed image.

In the reception screen D1, the multifunction peripheral 10 receives a selection instruction of a function and a setting to be executed by the multifunction peripheral 10. As follows, an operation flow of the multifunction peripheral 10 which has received the selection instruction of the function or the setting to be executed by the multifunction peripheral 10 is described in detail.

Figure 4:
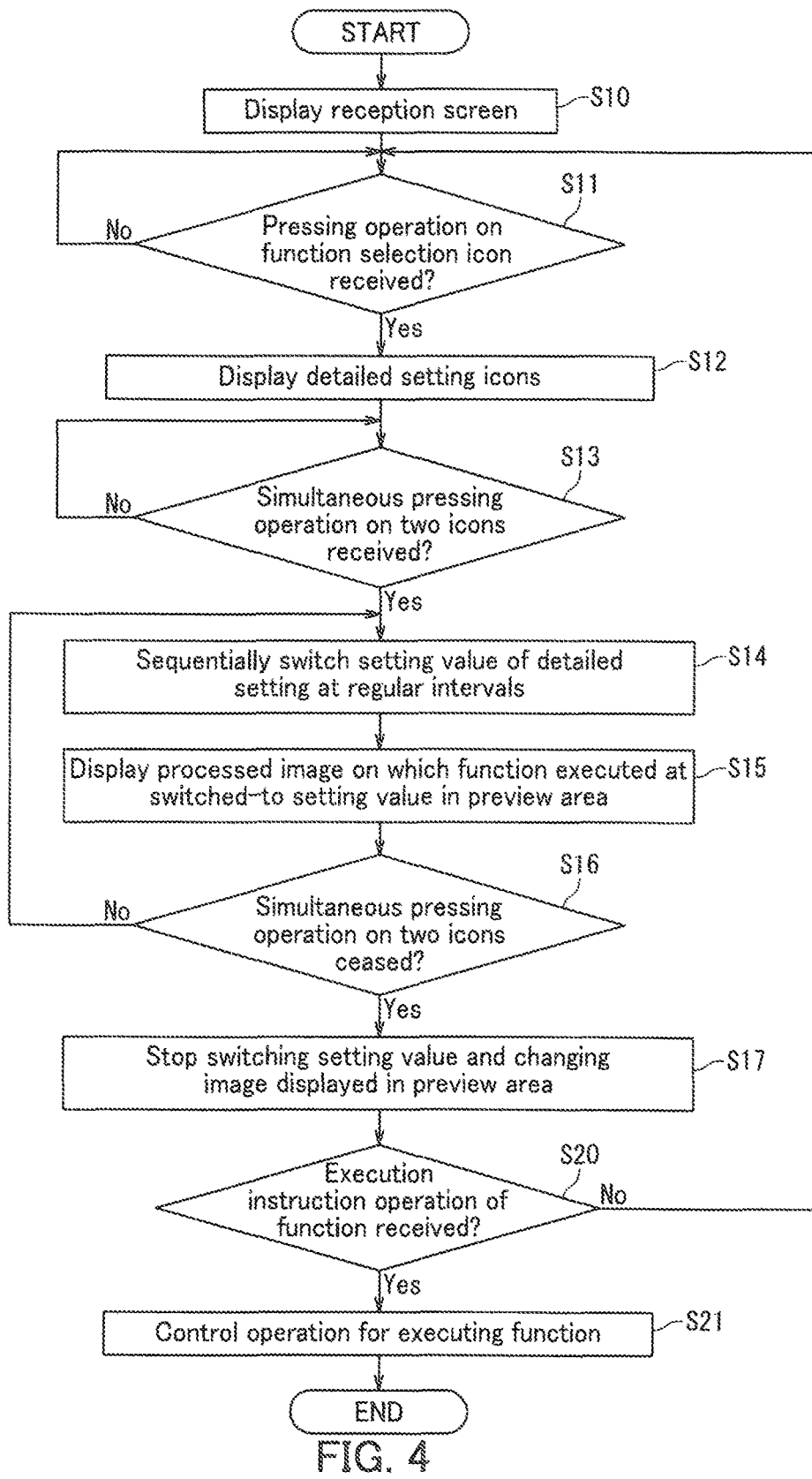
FIG. 4 is a flowchart illustrating a flow of operation of the multifunction peripheral, as an example of the image processing device according to the embodiment of the present disclosure.

FIG. 4 is a flowchart illustrating an operation flow of the multifunction peripheral 10. As illustrated in FIG. 4, first in the multifunction peripheral 10, the display controller 105 displays the reception screen D1 as illustrated in FIG. 3 on the touch panel 130 (Step S10). Then, when the operation reception section 103 receives an operation (an example of a fourth operation) in the reception screen D1 in which one of the icons d1 to d4 arranged in the function selection area R1 is pressed (YES in Step S11), the display controller 105 displays a plurality of detailed setting selection icons in the setting selection area R2 on the touch panel 130 (Step S12). The detailed setting icons respectively correspond to the configurable detailed settings pertaining to the selected function in the function selection area R1.

Figure 5A:
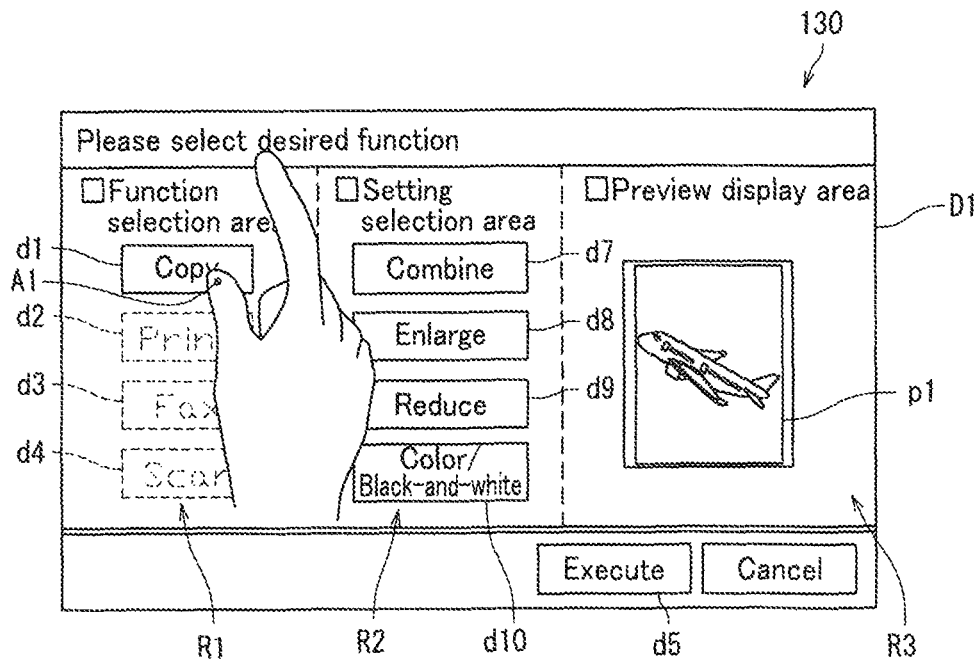
FIG. 5A is another diagram illustrating an example of the reception screen displayed by the touch panel of the multifunction peripheral, as an example of the image processing device according to the embodiment of the present disclosure.
Figure 5B:
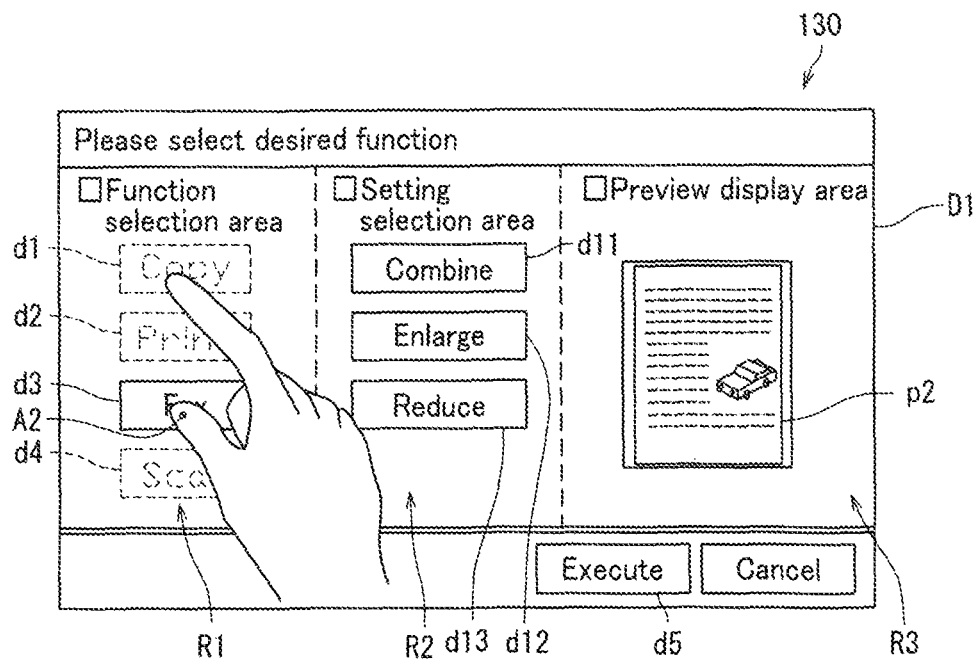
FIG. 5B is another diagram illustrating an example of the reception screen displayed by the touch panel of the multifunction peripheral, as an example of the image processing device according to the embodiment of the present disclosure.

FIGS. 5A and 5B are diagrams illustrating an example of the reception screen D1 displayed by the touch panel 130. In the example illustrated in FIG. 5A, an example of performance of the touch operation using a touch panel function to a location A1 on a display surface of the touch panel 130 is described. As illustrated in FIG. 5A, the icon d1 is arranged in the location A1. Therefore, the operation reception section 103 receives a pressing operation (touch operation) on the icon d1. When the operation reception section 103 receives the touch operation on the icon d1, the display controller 105 transparently displays, on the touch panel 130, the other icons d2 to d4 (indicated by dotted lines in FIG. 5A) among the icons d1 to d4 which are arranged in the function selection area R1. Also, the display controller 105 displays icons d7 to d10 (an example of a plurality of detailed setting selection icons) in the setting selection area R2 through the touch operation on the icon d1. The icons d7 to d10 respectively correspond to a plurality of configurable detailed settings pertaining to the copy function that corresponds to the icon d1. In the example illustrated in FIG. 5A, the icon d7 corresponds to the detailed setting related to "image combination", the icon d8 corresponds to the detailed setting related to "image enlargement", the icon d9 corresponds to the detailed setting related to "image size-reduction", and the icon d10 corresponds to the detailed setting related to "image color (full-color or greyscale)". Corresponding relationships of the detailed settings to these icons are stored in the storage device 160. Data indicating the configurable detailed settings pertaining to the functions are also stored in the storage device 160.

When the operation reception section 103 receives the touch operation on the icon d1, the display controller 105 displays a sample image p1 in the preview display area R3. The sample image p1 is a processed image which has undergone the copy function with a predetermined default value.

Referring to FIG. 5B, an example of performance of the touch operation using a touch panel function on a location A2 on the display surface of the touch panel 130 is described. As illustrated in FIG. 5B, the icon d3 is arranged in the location A2. Therefore, the operation reception section 103 receives a pressing operation (touch operation) on the icon d3. When the operation reception section 103 receives the touch operation on the icon d3, the display controller 105 transparently displays, on the touch panel 130, the other icons d1, d2, and d4 (indicated by dotted lines in FIG. 5B) among the icons d1 to d4 which are arranged in the function selection area R1. Also, the display controller 105 displays a plurality of icons d11 to d13 (an example of detailed setting selection icons) in the setting selection area R2 through the touch operation on the icon d3. The icons d11 to d13 respectively correspond to a plurality of configurable detailed settings pertaining to the facsimile function corresponding to the icon d3. In the example illustrated in FIG. 5B, the icon d11 corresponds to the detailed setting related to "image combination", the icon d12 corresponds to the detailed setting related to "image enlargement", and the icon d13 corresponds to the detailed setting related to "image size-reduction". Regarding the detailed setting related to "image color (full-color or greyscale)", the icon corresponding to the detailed setting related to "image color" is not displayed in the setting selection area R2 because this detailed setting is not configurable in the facsimile function.

Returning to FIG. 4, when the operation reception section 103 receives a simultaneous pressing operation (an example of a first and second operation) on two icons in the reception screen D1 (YES in Step S13): one of the function selection icons from among the plurality of function selection icons and one of the detailed setting selection icons from among the plurality of detailed setting selection icons, the display controller 105 performs Steps S14 and S15. In detail, the display controller 105 sequentially switches the setting value of the detailed setting corresponding to the pressed detailed setting selection icon from a default setting value to configurable setting values at regular predetermined intervals, while the simultaneous pressing operation is continued on the two icons (Step S14). In further detail, the display controller 105 changes the setting value stored in the storage device 160 from the default value to the configurable setting values at the regular predetermined intervals and stores the setting value in the storage device 160. The display controller 105 switches the setting value and displays a processed image to which the function with the switched-to setting value has been executed in the preview display area R3 (Step S15). Steps S14 and S15 are repeatedly performed while the simultaneous pressing operation is continued on the above-mentioned two icons (NO in Step S16).

Figure 6A:
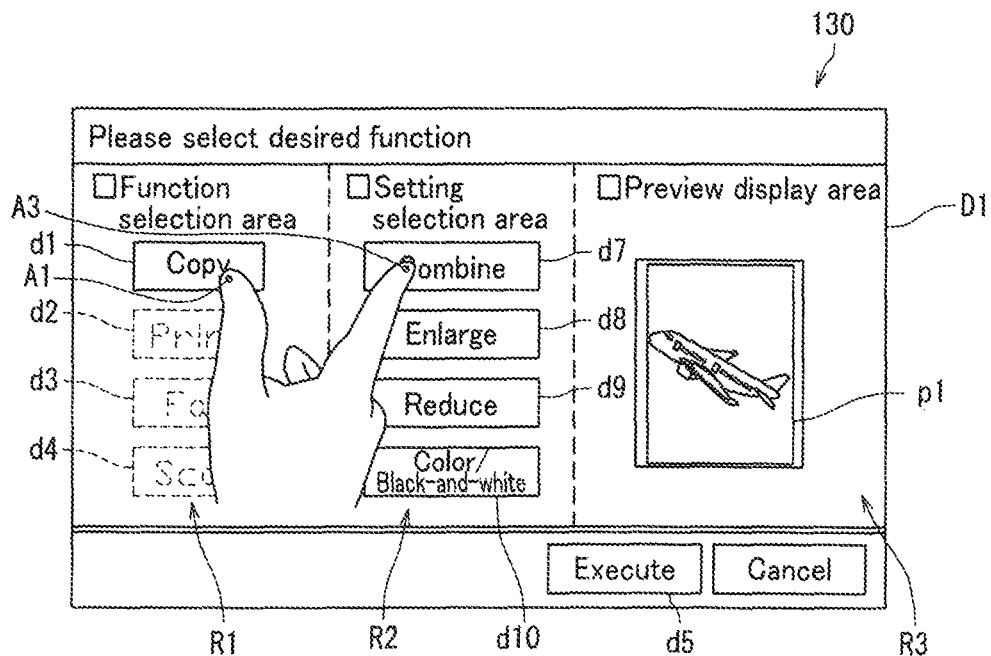
FIG. 6A is another diagram illustrating an example of the reception screen displayed by the touch panel of the multifunction peripheral, as an example of the image processing device according to the embodiment of the present disclosure.

FIG. 6A is a diagram illustrating an example of the reception screen D1 displayed by the touch panel 130. Referring to FIG. 6A, an example in which the pressing operation is performed on a location A3 on the display surface of the touch panel 130 by an index finger extending while a thumb presses the icon d1 illustrated in FIG. 5A is described. As illustrated in FIG. 6A, the icon d7 is arranged in the location A3. Therefore, the operation reception section 103 receives a simultaneous pressing operation on two icons: the icons d1 and d7. At this time, the display controller 105 sequentially switches the setting value of the detailed setting corresponding to the pressed icon d7, that is, the detailed setting related to "image combination", to configurable setting values at regular predetermined intervals (for example, three-second intervals). Specifically, the display controller 105 first switches the setting value of the detailed setting related to "image combination" to "2 in 1", then after three seconds switches the setting value to "4 in 1", then after another three seconds switches the setting value to "8 in 1". The display controller 105 switches the setting value back to "2 in 1" after switching the "8 in 1" setting value to "actual size".

Figure 6B:
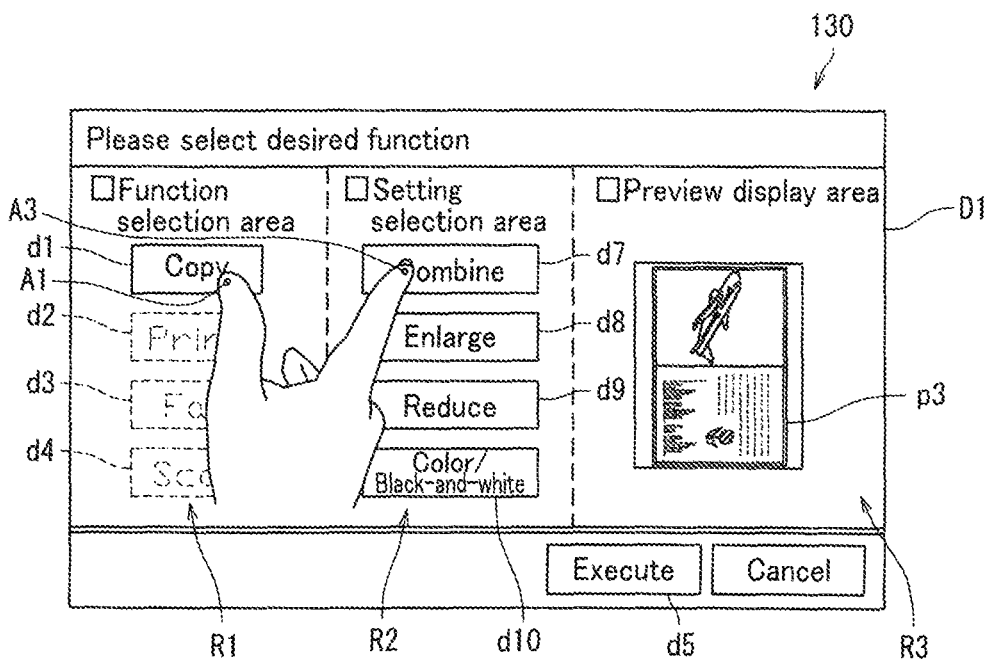
FIG. 6B is another diagram illustrating an example of the reception screen displayed by the touch panel of the multifunction peripheral, as an example of the image processing device according to the embodiment of the present disclosure.

Then, the display controller 105 displays the processed image to which the function with the switched-to setting value has been executed in the preview display area R3 on the touch panel 130. For example, when the simultaneous pressing operation is continued on the icons d1 and d7, the display controller 105 switches the setting value of the detailed setting related to image combination to "2 in 1". The display controller 105 also displays a sample image p3 in the preview display area R3, as illustrated in FIG. 6B. The sample image p3 is a processed image on which the copy function with the setting value of "2 in 1" has been executed.

Returning to FIG. 4, when the operation reception section 103 receives a cessation of the simultaneous pressing operation on the two icons: the function selection icon and the detailed setting selection icon (YES in Step S16), the display controller 105 stops switching the above-mentioned setting values, and stops changing the image displayed in the preview display area R3 (Step S17). Then, when the operation reception section 103 receives a function execution instruction operation (YES in Step S20), that is, a touch operation on an execution button d5 (refer to FIG. 5A) provided on the reception screen D1, the operation controller 102 controls an operation for executing a function at the setting value specified when the simultaneous pressing operation on the above-mentioned two icons has been ceased (Step S21). As a result, an image reading operation is performed by the image reading section 110 and an image forming operation is performed by the image forming section 120. Then, the recording paper with the image displayed in the preview display area R3 formed thereon is ejected to the exit tray 14. The image formed on the recording paper is the image displayed in the preview display area R3 when the simultaneous pressing operation on the two icons has been ceased.

As described above, according to the multifunction peripheral 10 of an aspect of the present disclosure, the user performs a simultaneous pressing operation on two icons: an icon corresponding to a desired function and an icon corresponding to a detailed setting of which a setting value is desired to be changed. Thus, the image displayed in the preview display area R3 switches as the user continues to press the two icons. The user, while confirming the image displayed in the preview display area R3, can configure a desired setting value by ceasing the simultaneous pressing operation on the above-mentioned two icons when the desired image is displayed. In this manner, the multifunction peripheral 10 displays an image including the function selection area R1, the setting selection area R2, and the preview display area R3 (the reception screen D1). Therefore, the user can have the multifunction peripheral 10 execute desired processing at the desired setting value without undergoing transition between multiple screens.

The following should be noted regarding the simultaneous pressing operation on the two icons including the function selection icon and the detailed setting selection icon. There may be a situation in which the simultaneous pressing operation on the two icons is ceased by ceasing to press the detailed setting selection icon but continuing to press the function selection icon (Step S16). Hereafter, as the function selection icon continues to be pressed, a detailed setting selection icon is pressed other than the detailed setting selection icon that has ceased to be pressed. In this situation, the display controller 105 switches the setting value of the other detailed setting selection icon while maintaining the setting value that was specified when the simultaneous pressing operation on the two icons was ceased (Step S14). That is, the display controller 105 sequentially switches the setting value of the detailed setting corresponding to the other detailed setting selection icon to configurable setting values at regular predetermined intervals. Upon switching the setting value, the display controller 105 displays a processed image in the preview display area R3. The function has been executed on the processed image at the setting value of the detailed setting specified when the simultaneous pressing operation on the above-mentioned two icons was ceased and the switched-to setting value of the detailed setting corresponding to the other detailed setting selection icon.

FIG. 6B is a diagram illustrating an example of the reception screen D1 displayed by the touch panel 130. For example, as illustrated in FIG. 6B, in a situation in which the setting value of the detailed setting related to "image combination" is "2 in 1", the simultaneous pressing operation on the icons d1 and d7 is ceased. Thereafter, when the operation reception section 103 receives a simultaneous pressing operation on the icons d1 and d8, the display controller 105 switches the setting value of the detailed setting related to "image enlargement" while maintaining "2 in 1" as the setting value of the detailed setting related to "image combination". Specifically, the display controller 105 displays a processed image on which the function has been executed with the setting value of "2 in 1" with magnification rate setting values sequentially switched in the preview display area R3.

Note that the present disclosure is not limited to the configuration of the above-mentioned embodiment and can be implemented in various ways.

(First Variation)

Figure 7:
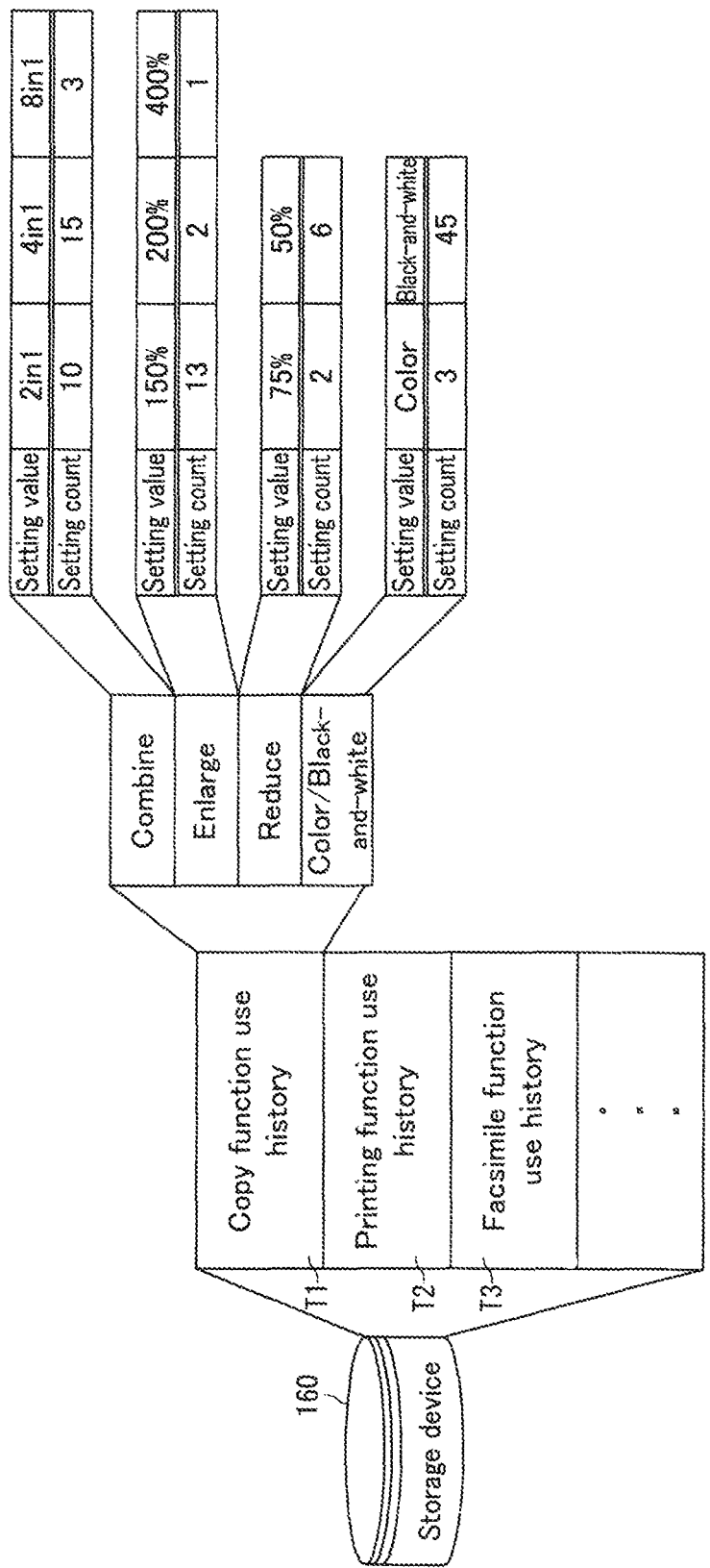
FIG. 7 is a diagram illustrating an example of data stored in a storage device of the multifunction peripheral, as an example of the image processing device according to a variation.

In a multifunction peripheral according to a first variation of the above-mentioned embodiment, the storage device 160 stores counts (an example of execution counts) of the number of times the operation controller 102 has controlled operations for executing the functions, in association with each of setting values of detailed settings. FIG. 7 is a diagram illustrating an example of data stored in the storage device 160. As illustrated in FIG. 7, the storage device 160 stores copy function use history information T1, printing function use history information T2, and facsimile function use history information T3. The copy function use history information T1 indicates a count of the operations that have been done for executing the copy function. The printing function use history information T2 indicates a count of the operations that have been done for executing the printing function. The facsimile function use history information T3 indicates a count of the operations that have been done for executing the facsimile function.

Each set of use history information contains counts of the number of times the setting values have been respectively configured for each of the configurable detailed settings pertaining to the corresponding function. In the example illustrated in FIG. 7, for example, the count of the number of times that the setting value pertaining to the detailed setting related to "image combination" has been configured to "2 in 1" is ten, the count for the setting value "4 in 1" is fifteen, and the count for the setting value "8 in 1" is three.

Figure 8A:
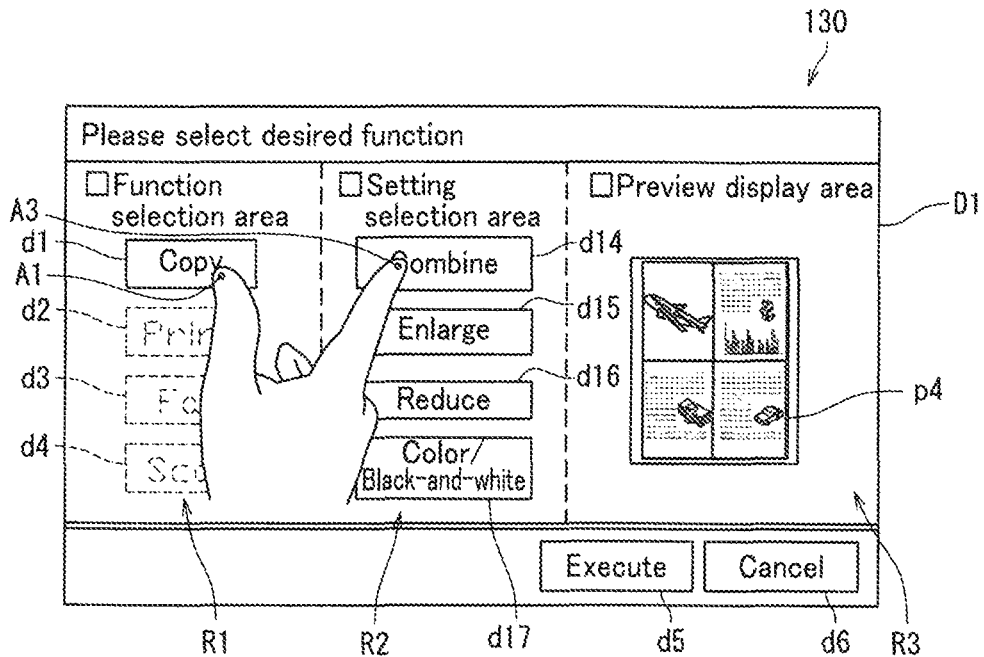
FIG. 8A is a diagram illustrating an example of the reception screen displayed by the touch panel of the multifunction peripheral, as an example of the image processing device according to the variation.

While the simultaneous pressing operation is continued on two icons, the display controller 105 sequentially switches the setting values of the detailed setting corresponding to the pressed detailed setting selection icon, in order of largest count stored in the storage device 160. In the example illustrated in FIG. 7, the largest count is the number of times the setting value of the detailed setting related to "image combination" has been configured to "4 in 1", and the next largest count is to "2 in 1". Because of this, the display controller 105 first switches the setting value of the detailed setting related to "image combination" to "4 in 1" when the operation reception section 103 receives a simultaneous pressing operation on the icons d1 and d7. After three seconds, the display controller 105 switches the setting value to "2 in 1", and after another three seconds switches the setting value to "8 in 1". Therefore, as illustrated in FIG. 8A, the display controller 105 displays a sample image p4 on which image processing has been executed at the setting value of "4 in 1" first in the preview display area R3. The count of the number of times the setting value has been configured to "4 in 1" is high, that is, likelihood of the user most often configuring the setting value to "4 in 1" is high. FIG. 8A is a diagram illustrating an example of the reception screen D1 displayed by the touch panel 130 in the multifunction peripheral 10 according to the first variation.

In this manner, in the multifunction peripheral according to the first variation, the display controller 105 sequentially switches the setting value from the setting value with a high probability of being configured by the user. Therefore, the user can configure a desired setting value through a simple operation.

Also, according to the first variation, the display controller 105 may change sizes of the detailed setting selection icons arranged in the setting selection area R2. In detail, the display controller 105 may display the detailed setting selection icons in different sizes depending on how many times the setting value of the corresponding detailed setting has been changed. The detailed setting icon with the largest size corresponds to the detailed setting with the highest setting value change count, based on the use history information stored in the storage device 160. In the example illustrated in FIG. 7, a change count of the setting value corresponding to the detailed setting related to "image combination" is 28. The change count of the setting value corresponding to the detailed setting related to "image enlargement" is 16. The change count of the setting value corresponding to the detailed setting related to "image size-reduction" is 8. The change count of the setting value corresponding to the detailed setting related to "image color" is 48. That is, the count of the number of times the detailed settings have been changed ranks from largest to smallest in the following order: the detailed setting related to "image color", the detailed setting related to "image combination", the detailed setting related to "image enlargement", and the detailed setting related to "image size-reduction". Because of this, the display controller 105 may display the icon d17 in the largest size from among the detailed setting selection icons arranged in the setting selection area R2, as illustrated in FIG. 8. The icon d17 corresponds to the detailed setting related to "image color".

In this manner, in the multifunction peripheral according to the first variation, the icons corresponding to the detailed settings are displayed in different sizes depending on likelihood that the user will configure the detailed setting, with the largest icon corresponding to the detailed setting of the highest likelihood. Because of this, the user can easily configure the desired detailed setting through a pressing operation.

Figure 8B:
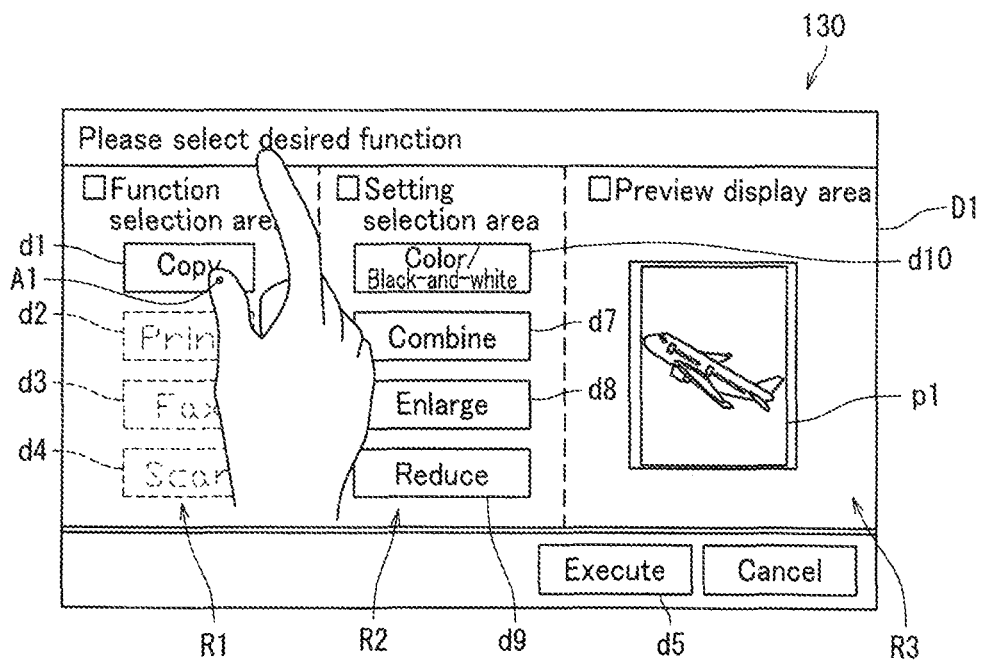
FIG. 8B is another diagram illustrating an example of the reception screen displayed by the touch panel of the multifunction peripheral, as an example of the image processing device according to the variation.

Also, the display controller 105 may change the arrangement of the detailed setting selection icons in the setting selection area R2, based on the use history information stored in the storage device 160. In detail, the display controller 105 may arrange the detailed setting selection icons from the top of the setting selection area R2, in order of counts of the number of times detailed setting has been changed starting with the highest count. FIG. 8B is a diagram illustrating an example of the reception screen D1 displayed on the touch panel 130 in the multifunction peripheral 10 according to the first variation. In the example illustrated in FIG. 8B, the display controller 105 may arrange the detailed setting icons from the top of the inside of the setting selection area R2 in the following order: the icon d10 corresponding to the detailed setting related to "image color", the icon d7 corresponding to the detailed setting related to "image combination", the icon d8 corresponding to the detailed setting related to "image enlargement", and the icon d9 corresponding to the detailed setting related to "image size-reduction". The display order is determined based on the use history information illustrated in FIG. 7. The top section of the reception screen D1 (setting selection area R2) is the easiest section for the user to see. Therefore, the user can easily perform the pressing operation on the desired detailed setting because the detailed setting selection icons are arranged in order of likelihood that the corresponding detailed setting will be configured by the user, starting at the top section inside of the setting selection area R2.

Note that above, the display controller 105 is described in two configurations: (1) a configuration in which the sizes of the detailed setting selection icons arranged in the setting selection area R2 are changed, and (2) a configuration in which the arrangement of the detailed setting selection icons in the setting selection area R2 is changed. The changes in both configurations are based on the use history information stored in the storage device 160. However, the display controller 105 may combine both of the above-mentioned configurations (1) and (2). That is, the display controller 105 may change both the size of the detailed setting selection icons arranged in the setting selection area R2 and the arrangement of the detailed setting selection icons in the setting selection area R2, based on the use history information stored in the storage device 160.

(Second Variation)

In the above-mentioned embodiment, the operation reception section 103 is described as receiving a simultaneous pressing operation on two icons: one of the function selection icons and one of the detailed setting selection icons. However, the present disclosure is by no means limited to this situation. In a multifunction peripheral according to a second variation of the above-mentioned embodiment, the operation reception section 103 receives a simultaneous pressing operation on at least three icons (an example of a third operation): one of the function selection icons from among the plurality of function selection icons and at least two detailed setting selection icons from among the plurality of detailed setting selection icons. In this situation, while the simultaneous pressing operation is continued on the three or more icons, the display controller 105 sequentially switches the respective setting values of at least two detailed settings corresponding to at least two pressed detailed setting selection icons to configurable setting values at regular predetermined intervals. Then, the display controller 105 switches the setting values and changes the image displayed in the preview display area R3 to a processed image to which the function with the switched-to setting values have been executed.

For example, in the reception screen D1 illustrated in FIG. 6B, when the operation reception section 103 receives the simultaneous pressing operation on three icons: icons d1, d7, and d8, the display controller 105 alternately switches the setting values corresponding to the detailed settings related to "image combination" and "image enlargement". In detail, the display controller 105 sequentially switches the processed images displayed in the preview display area R3. For example, functions with the following setting values related to combination and enlargement have been executed on the processed images: (1) combination of "2 in 1" and enlargement of "150%", (2) combination of "4 in 1" and enlargement of "150%", and (3) combination of "4 in 1" and enlargement of "200%".

(Third Variation)

Figure 9A:
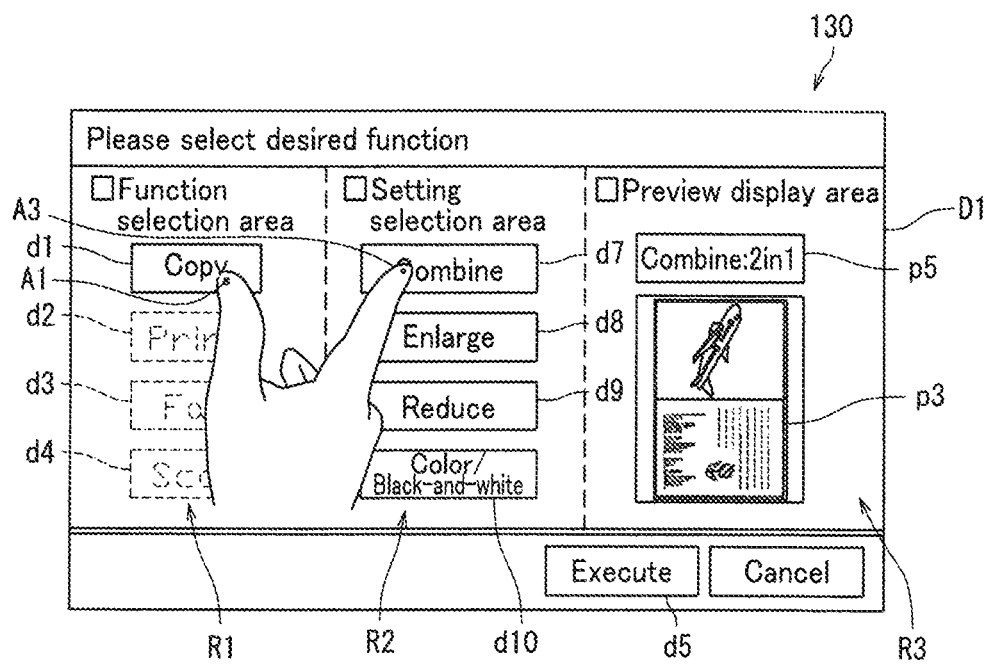
FIG. 9A is a diagram illustrating an example of the reception screen displayed by the touch panel of the multifunction peripheral, as an example of the image processing device according to another variation.
Figure 9B:
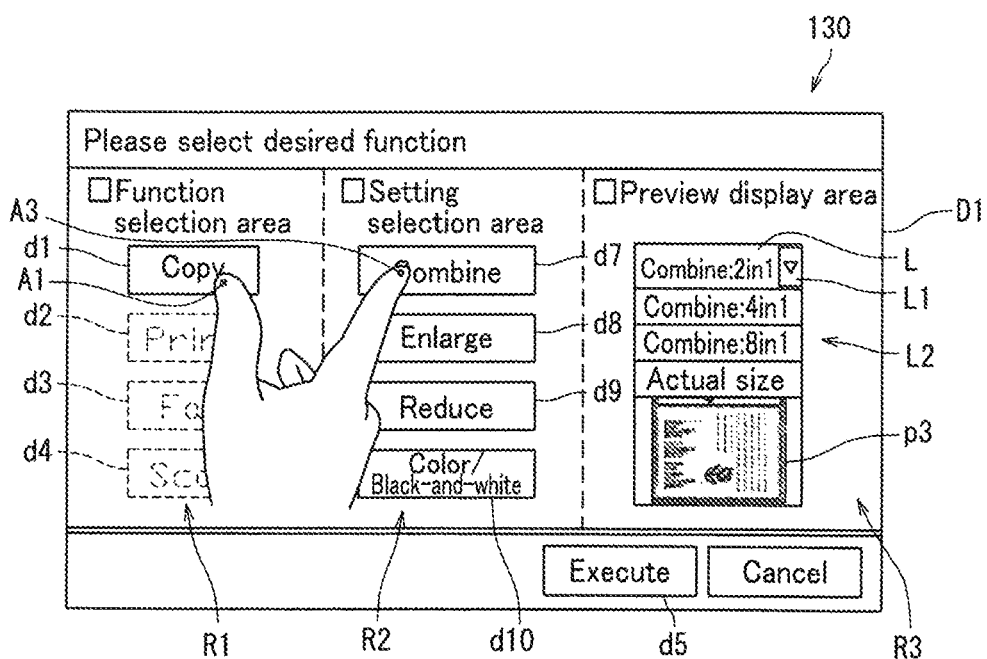
FIG. 9B is another diagram illustrating an example of the reception screen displayed by the touch panel of the multifunction peripheral, as an example of the image processing device according to the other variation.

FIGS. 9A and 9B are diagrams illustrating an example of the reception screen D1 displayed on the touch panel 130 in the multifunction peripheral 10 according to a third variation of the above-mentioned embodiment. In the third variation, the display controller 105 displays a setting value image p5 in addition to the sample image p3 of the processed image on which a function has been executed in the preview display area R3. The setting value image p5 indicates a setting value that is configured through the simultaneous pressing operation on two icons: the function selection icon and the detailed setting selection icon.

In the example illustrated in FIG. 9A, "2 in 1" is configured as the setting value related to "image combination" through the continuation of the simultaneous pressing operation on the icons d1 and d7. Because of this, the display controller 105 displays the setting value image p5 indicating the setting value of "2 in 1" in the preview display area R3.

According to an aspect of the present disclosure, the setting value switches through the simultaneous pressing operation on the two icons: the function selection icon and the detailed setting selection icon. However, in the configuration according to the third variation, the setting value image p5 is displayed in the preview display area R3 in addition to the sample image p3 of the processed image on which the function has been executed. The setting value image p5 indicates the setting value configured through the simultaneous pressing operation on the two icons: the function selection icon and the detailed setting selection icon. Because of this, the user can more easily confirm the contents of the currently configured setting values.

(Fourth Variation)

Figure 10A:
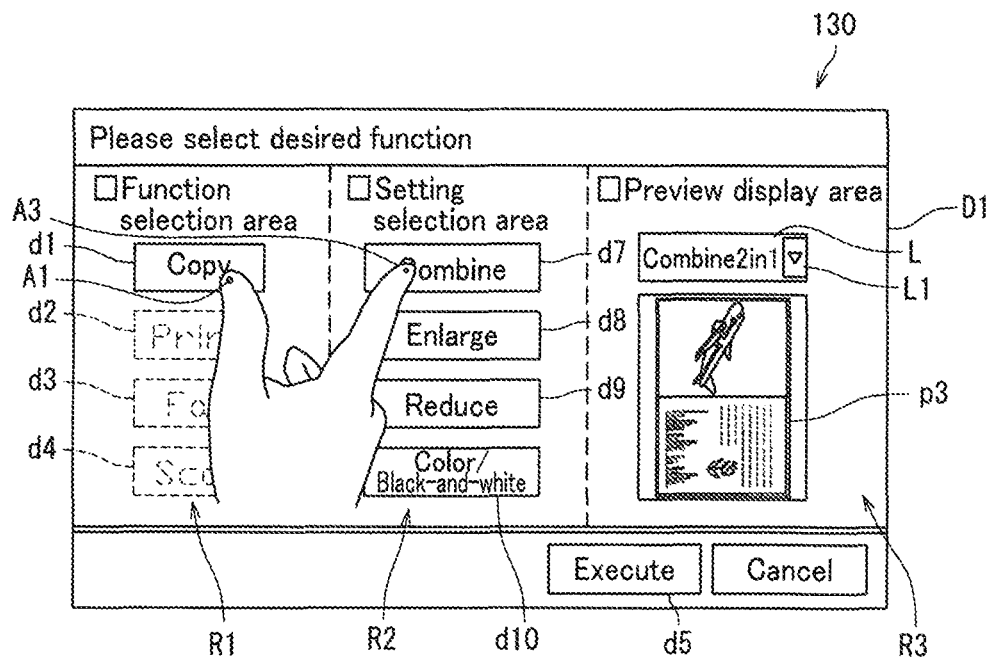
FIG. 10A is a diagram illustrating an example of the reception screen displayed by the touch panel of the multifunction peripheral, as an example of the image processing device according to an additional variation.
Figure 10B:
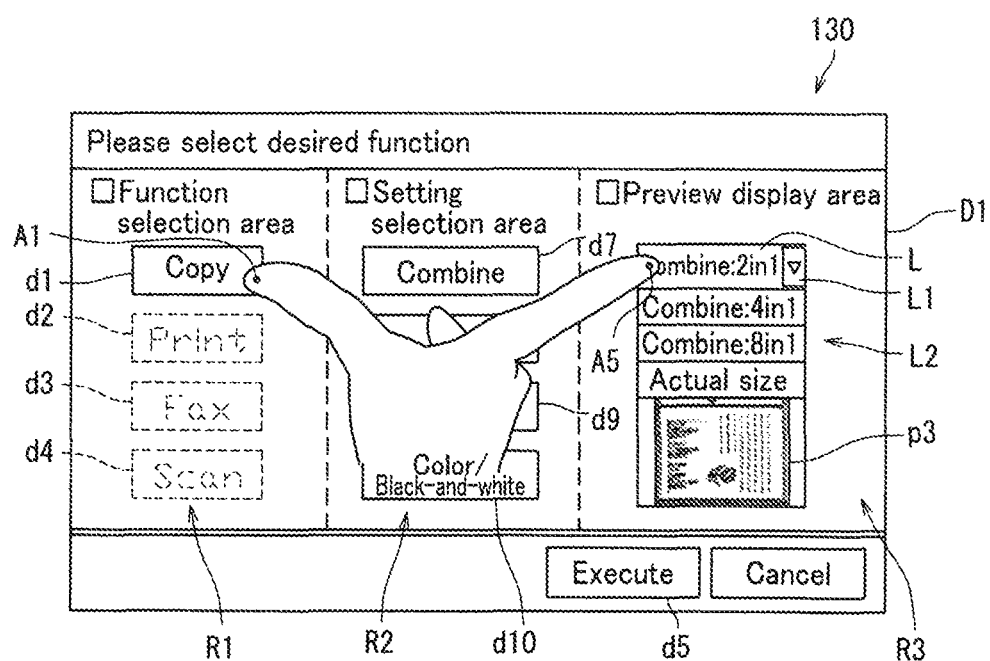
FIG. 10B is another diagram illustrating an example of the reception screen displayed by the touch panel of the multifunction peripheral, as an example of the image processing device according to the additional variation.
Figure 11:
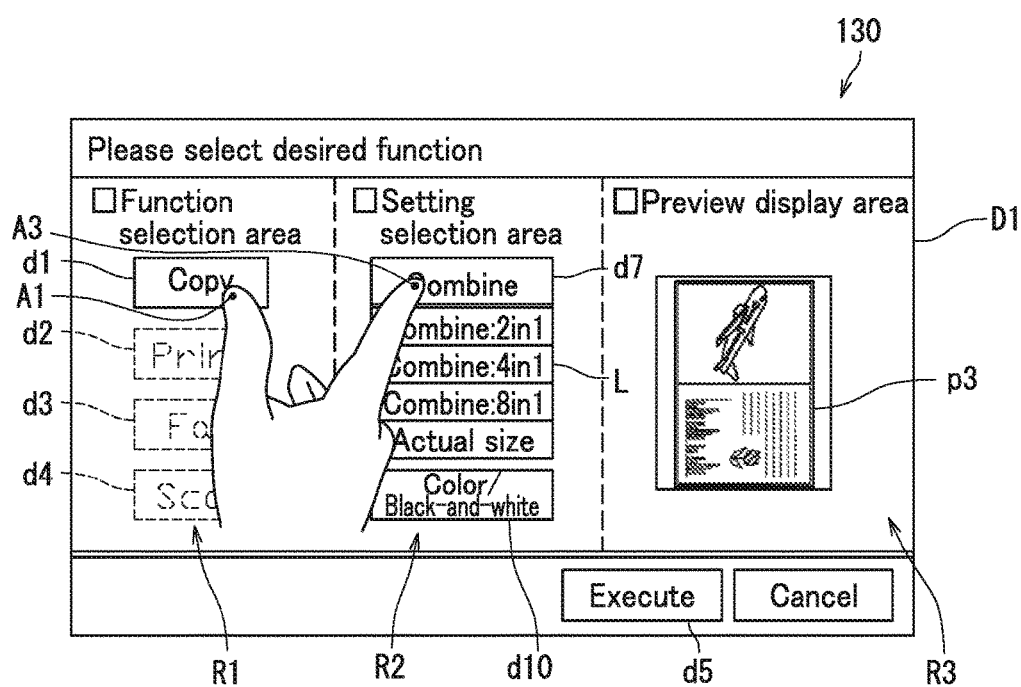
FIG. 11 is yet another diagram illustrating an example of the reception screen displayed by the touch panel of the multifunction peripheral, as an example of the image processing device according to the additional variation.

FIGS. 10A to 11 are diagrams illustrating an example of the reception screen D1 displayed on the touch panel 130 in the multifunction peripheral 10 according to a fourth variation of the above-mentioned embodiment. In the fourth variation, the display controller 105 displays a pull-down menu L in the preview display area R3, in addition to the sample image p3 of the processed image on which the function has been executed. The pull-down menu L is for receiving changes to the setting value.

The pull-down menu L indicates setting values configured through the simultaneous pressing operation on the two icons: the function selection icon and the detailed setting selection icon. In the example illustrated in FIG. 10B, an example is described in which the index finger as illustrated in FIG. 10A is extended, and a touch operation on a pull-down button L1 or a location A5 inside the pull-down menu L is performed. When the operation reception section 103 receives a touch operation on the pull-down menu L, the display controller 105 displays a pull-down list L2 on the touch panel 130. The pull-down list L2 shows a list of changeable setting values. In the example illustrated in FIG. 10B, the list of setting values corresponding to the detailed setting related to "image combination" is displayed. Then, when the operation reception section 103 receives a selection (touch) operation on one of the setting values from among the plurality of setting values shown in the pull-down list L2, the display controller 105 switches the setting value of the detailed setting to the setting value on which the touch operation has been performed. Thereafter, the display controller 105 displays the processed image on which the function with the switched-to setting value has been executed in the preview display area R3.

In the multifunction peripheral according to the fourth variation, it is possible to return to a previously switched-to setting through a pressing operation on the pull-down list L2. In other words, it is not necessary to continue pressing the detailed setting selection icon to return a once switched-to setting value to the setting value that was previously switched to. Therefore, the setting value can be changed in a shorter period of time.

Also, as illustrated in FIG. 11, the display controller 105 may display the pull-down menu L in the setting selection area R2, beneath the detailed setting selection icons on which the pressing operation has been received by the operation reception section 103. When the detailed setting selection icon illustrated in FIG. 11 undergoes a slide operation while being pressed and the operation reception section 103 receives the pressing operation on one of the setting values from among the plurality of setting values shown on the pull-down list L2, the display controller 105 switches the setting value of the detailed setting to the setting value on which the selection operation has been performed and displays the processed image on which the function with the switched-to setting value has been executed in the preview display area R3. Herewith, the user can change the setting value through an operation in which the index finger is slid down while pressing from the detailed setting selection icon to a desired location and is then lifted from the screen.

What is claimed is:

1. An image processing device, comprising:
a touch panel including a display and a touch sensor; and
a controller configured to control display operation by the display and receive operations on the touch sensor, wherein
the controller controls operations for executing a plurality of functions according to the operations on the touch sensor,
the functions are functions related to image processing, and include at least an image forming function to form an image on recording paper and an image reading function to read an image from an original document,
the controller displays a reception screen which includes a plurality of function selection icons, a plurality of detailed setting selection icons, and a preview area on the display,
the function selection icons respectively correspond to the functions,
the detailed setting selection icons respectively correspond to a plurality of detailed settings which are configurable with respect to each of the functions,
the preview area shows a processed image on which one function from among the functions has been executed,
when a first operation, from among the operations, in which at least two icons including one function selection icon from among the function selection icons and at least one detailed setting selection icon from among the detailed setting selection icons are simultaneously pressed is received in the reception screen, the controller sequentially switches a setting value of a detailed setting corresponding to the pressed detailed setting selection icon at regular predetermined intervals and changes an image displayed in the preview area to a processed image on which the function has been executed at the switched-to setting value, while the first operation is continued,
when the first operation is ceased, the controller stops switching the setting value and changing the image displayed in the preview area, and
after the first operation has been ceased, when an execution instruction operation of the function is received, the controller controls an operation for executing the function at the setting value specified when the first operation was ceased.

2. The image processing device according to claim 1, wherein
the first operation is a second operation in which two icons including one function selection icon from among the function selection icons and one detailed setting selection icon from among the detailed setting selection icons are simultaneously pressed.

3. The image processing device according to claim 2, wherein
when the second operation is ceased by ceasing to press on the detailed setting selection icon and continuing to press on the function selection icon from among the two pressed icons, and a detailed setting selection icon is pressed other than the detailed setting icon on which the pressing has been ceased while pressing is continued on the function selection icon, the controller sequentially switches a setting value of a detailed setting corresponding to the other detailed setting selection icon at regular predetermined intervals, and changes an image displayed in the preview area to a processed image on which the function has been executed at a setting value of the detailed setting specified when the second operation was ceased and the switched-to setting value of a detailed setting corresponding to the other detailed setting selection icon.

4. The image processing device according to claim 1, wherein
the first operation is a third operation in which at least three icons including one function selection icon from among the function selection icons and at least two detailed setting selection icons from among the detailed setting selection icons are simultaneously pressed, and
when the third operation is received, the controller sequentially switches respective setting values of at least two detailed settings corresponding to the at least two pressed detailed setting selection icons at regular predetermined intervals, and changes an image displayed in the preview area to a processed image on which the function has been executed at the switched-to setting values while the third operation is continued.

5. The image processing device according to claim 1, wherein
when a fourth operation in which one function selection icon among the function selection icons is pressed in the reception screen is received, the controller displays on the reception screen a plurality of detailed setting selection icons respectively corresponding to a plurality of configurable detailed settings of a function corresponding to the pressed function selection icon from among the detailed setting selection icons.

6. The image processing device according to claim 1, further comprising:
a storage device configured to store execution counts in association with each of setting values of detailed settings, each of the execution counts being the number of times the controller has controlled an operation for executing the corresponding function at one of the setting values, wherein
the controller sequentially switches a setting value of a detailed setting corresponding to the pressed detailed setting selection icon in order of largest execution count stored in the storage device, while the first operation is continued.

* * * * *